United States Patent
Konno

(10) Patent No.: US 7,290,173 B2
(45) Date of Patent: Oct. 30, 2007

(54) COMMUNICATION APPARATUS

(75) Inventor: Yuuji Konno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 540 days.

(21) Appl. No.: 11/018,986

(22) Filed: Dec. 21, 2004

(65) Prior Publication Data

US 2006/0085694 A1   Apr. 20, 2006

(30) Foreign Application Priority Data

Sep. 28, 2004   (JP)   ............................. 2004-282592

(51) Int. Cl.
*G06F 11/00*   (2006.01)
(52) U.S. Cl. .................................................. 714/25
(58) Field of Classification Search ................. 714/25, 714/4, 26
See application file for complete search history.

(56) References Cited

U.S. PATENT DOCUMENTS

| | | | |
|---|---|---|---|
| 6,199,140 B1 * | 3/2001 | Srinivasan et al. | 711/108 |
| 6,594,227 B1 * | 7/2003 | Ogawa et al. | 370/216 |
| 6,714,985 B1 * | 3/2004 | Malagrino et al. | 709/236 |
| 7,216,204 B2 * | 5/2007 | Rosenbluth et al. | 711/141 |
| 2005/0028216 A1 * | 2/2005 | Vogel et al. | 725/107 |

FOREIGN PATENT DOCUMENTS

| | | |
|---|---|---|
| JP | 07-111504 | 4/1995 |
| JP | 2003-169003 | 6/2003 |

* cited by examiner

*Primary Examiner*—Nadeem Iqbal
(74) *Attorney, Agent, or Firm*—Katten Muchin Rosenman LLP

(57) ABSTRACT

In a communication apparatus performing communication using IP packets, a diagnostic frame terminator terminates a series of latest status information of diagnosed devices recorded in a diagnostic frame every time the diagnostic frame sequentially passes through a series of diagnosed devices connected in cascade; a content addressable memory preliminarily stores therein as a single entry a series of normal status information in which each status information of the series of diagnosed devices in a normal state is arranged in an order of connection of the diagnosed devices, and generates an abnormality notification when the terminated series of latest status information does not hit the entry; a status information storage stores the terminated series of latest status information; and a CPU acquires, upon receipt of the abnormality notification, the terminated series of the latest status information from the status information storage to be outputted.

8 Claims, 9 Drawing Sheets

FIG.4A

NORMAL IPv4 FRAME Fv4

| | |
|---|---|
| SOURCE MAC ADDRESS | 0000 |
| | 0E00 |
| | 0000 |
| DESTINATION MAC ADDRESS | 0000 |
| | 0E00 |
| | 00FF |
| TAG | 8100 |
| | 0002 |
| TYPE | 0800 |
| IP HEADER | →4500 |
| | 0000 |
| | 0000 |
| | 0000 |
| | 0000 |
| | FFFF |
| SOURCE IP ADDRESS | 0A01 |
| | 0308 |
| DESTINATION IP ADDRESS | 0A02 |
| | 040C |
| DATA | FFFF |
| | 0010 |
| | 0020 |
| | 0040 |
| | 0080 |
| | 0100 |
| | 0200 |
| | 0400 |
| | 0800 |
| | FFFF |
| | FFFF |
| | FFFF |
| | FFFF |
| | FFFF |
| | FFFF |
| | FFFF |
| | FFFF |
| | FFFF |

FIG.4B

DIAGNOSTIC FRAME F0

| | |
|---|---|
| SOURCE MAC ADDRESS | 0000 |
| | 0E00 |
| | 0000 |
| DESTINATION MAC ADDRESS | 0000 |
| | 0E00 |
| | 00FF |
| TAG | 8100 |
| | 0002 |
| TYPE | 0800 |
| IP HEADER | →0500 |
| | 0000 |
| | 0000 |
| | 0000 |
| | 0000 |
| | FFFF |
| SOURCE IP ADDRESS | 0A01 |
| | 0308 |
| DESTINATION IP ADDRESS | 0A02 |
| | 040C |
| STATUS INFORMATION OF DEVICE 1 (32 BITS) | 0000 |
| | 0000 |
| | 0000 |
| | 0000 |
| STATUS INFORMATION OF DEVICE 2 (32 BITS) | 0000 |
| | 0000 |
| | 0000 |
| | 0000 |
| STATUS INFORMATION OF DEVICE 3 (32 BITS) | 0000 |
| | 0000 |
| | 0000 |
| | 0000 |
| PADDING | FFFF |
| | FFFF |
| | FFFF |
| | FFFF |
| | FFFF |

COMMUNICATION APPARATUS

BACKGROUND OF THE INVENTION

1. Field of the Invention

The present invention relates to a communication apparatus, and in particular to a communication apparatus performing a communication function maintenance/diagnosis in a communication system using IP packets.

2. Description of the Related Art

In a communication system using IP packets, a communication function maintenance/diagnosis have been performed in order to detect abnormalities of various kinds of communication devices and to provide maintenance thereof. As will be described hereinafter, there are known as representative examples, (1) a method in which a CPU in charge of management operation of communication functions is given an interrupt notification upon occurrence of an abnormality of a communication device, and (2) a method in which a CPU periodically performs polling for detecting abnormalities of the communication devices.

Firstly, the former method that is the communication function maintenance/diagnosis method (1) will be described referring to FIGS. 7 and 8. It is to be noted that a partition among hardware 100, software 200, and an operation manager or upper-level CPU 300 shown in FIG. 7 indicates roughly partitioned functions but not an exact partition thereof.

This method incorporates an abnormality detector 10 provided with an indicator 11 and an interrupt controller 12 for the function of the hardware 100, and a CPU 20 located on the border of the functions of the hardware 100 and the software 200.

The indicator 11 in the abnormality detector 10 is generally composed of a register whose bits are associated with diagnosed devices (not shown). The interrupt controller 12 generates an interrupt signal to the CPU 20 as necessary.

In operation, when the abnormality detector 10 receives an abnormality notification S1 from one of the devices connected to the hardware 100, the bit of the corresponding device is changed to a value of an abnormal state in the indicator 11, and an interrupt notification S2 is provided by the interrupt controller 12 to the CPU 20.

The CPU 20 having received the interrupt notification S2 accesses the indicator 11 and performs questioned point identification processing S3 so as to identify which of the devices is abnormal. Thereafter, the CPU 20 provides a notification S30 related to the abnormality occurrence to the operation manager or upper-level CPU 300, and directly accesses the abnormal device to provide status information acquisition processing S4, thereby acquiring detailed status information.

It is to be noted that the above-mentioned notification S30 related to the abnormality occurrence can be performed, for example, by illuminating an LED corresponding to the abnormal point, or the like in case of notification to the operation manager.

FIG. 8 shows an internal arrangement of a router X adopting such a communication function maintenance/diagnosis method (1). As shown, the router X is composed of devices 1-3 connected with a line bus 5 sequentially from a line interface 4, the CPU 20 connected to the devices 1-3 respectively with a PCI bus 6, and the abnormality detector 10 connected to the CPU 20 with the CPI bus 6. Namely, FIG. 8 shows the connection relationships between the abnormality detector 10 as well as the CPU 20 and the devices 1-3 shown in FIG. 7.

Also, a content addressable memory 7 is connected to the device 3. The content addressable memory 7 has e.g. IP address information as an entry, and is used in ordinary IP packet processing.

In operation, for example, when a failure occurs in the device 2, the abnormality notification S1 is provided from the device 2 to the abnormality detector 10. The abnormality detector 10 having received this notification indicates the abnormality of the device 2 with the corresponding bit of the indicator 11 and provides the interrupt notification S2 from the interrupt controller 12 to the CPU 20.

The CPU 20 having received the interrupt notification S2 performs the questioned point identification processing S3 to identify that the device 2 is abnormal, so that by accessing the device 2 through the PCI bus 6 the CPU 20 performs the status information acquisition processing S4.

It is to be noted, although not shown in FIG. 8, the devices 1-3 and the abnormality detector 10 are mutually connected respectively with a control line, and that the interrupt controller 12 of the abnormality detector 10 and the CPU 20 are also mutually connected with a control line. Therefore, the above-mentioned abnormality notification S1 and the interrupt notification S2 are respectively notified instantaneously through the control lines.

The communication function maintenance/diagnosis method (2) will be described referring to FIG. 9. In FIG. 9, it is to be noted that an abnormality detector 30 and a CPU 40 respectively substitute for the abnormality detector 10 and the CPU 20 of FIG. 7. The abnormality detector 30 has an indicator 31 similar to the indicator 11 in the abnormality detector 10 but does not have a functional part corresponding to the interrupt controller 12. Also, FIG. 9 is different from FIG. 7 in that the CPU 40 periodically performs questioned point identification processing S5 by a periodical polling.

In operation, when the abnormality detector 30 receives the abnormality notification S1 from one of the devices, a bit of the corresponding device is changed to a value of an abnormal state in the indicator 31.

As described above, since the CPU 40 performs the questioned point identification processing S5 by the periodical polling. Therefore, when an abnormality of any of the devices is indicated by the indicator 31 at the time of this processing S5, the CPU 40 can detect the abnormality and can identify the questioned point.

When the questioned point can be thus identified, the CPU 40 provides a notification S30 related to the abnormality occurrence to the operation manager or the upper-level CPU 300, and directly accesses the abnormal device and performing status information acquisition processing S6, thereby acquiring detailed status information.

As a communication function maintenance/diagnosis method other than the above-mentioned methods (1) and (2), there is one which can always monitor signal lines by a loopback test and can perform remote control, that relates to a maintenance/operation management function of a network to which a plurality of communication apparatuses are connected, (see e.g. patent document 1).

In this method, there are a first circuit for inserting management data such as test data into a preamble of a packet to be transmitted to a general-purpose interface and for detecting the management data such as test data returned by being inserted in an idle time between packets received from the general-purpose interface, and a second circuit for detecting the management data inserted into the preamble of the packet to be received from the general-purpose interface and for inserting the management data into the idle time of the general-purpose interface. Also, the second circuit detects the test data inserted into the preamble to be returned in the idle time of the general-purpose interface, thereby performing the loopback test.

Also, there is a communication function maintenance/diagnosis method that realizes a highly reliable maintenance/diagnosis while avoiding misdiagnosis caused by a failure on a maintenance interface abnormality processing side (see e.g. patent document 2).

In this method, the maintenance interface selects an abnormality occurrence pattern corresponding to a maintenance/diagnosis request from an operator from among a group of abnormality occurrence pattern libraries and an abnormal pattern generator generates an abnormal cell corresponding to the abnormality occurrence pattern to be transmitted to the node at the diagnosed point. Also, in the node at the diagnosed point, the abnormality detector detects the received abnormal cell and an abnormality analyzer/notifier analyzes the abnormality by comparing the abnormality with a failure database, thereby checking whether or not the abnormality detection side operates appropriately against pseudo-failure.

[Patent document 1] Japanese patent application laid-open No. 2003-169093

[Patent document 2] Japanese patent application laid-open No. 7-11104

In the above-mentioned communication function maintenance/diagnosis method (1), since the interrupt controller 12 of the abnormality detector 10 having received the abnormality notification S1 immediately performs the interrupt notification S2, a lapse between an occurrence of a failure in a certain device and a reception of the interrupt notification S2 by the CPU 40 is short. However, since both of the questioned point identification processing S3 and the status information acquisition processing S4 performed thereafter by the CPU 20 before acquiring required status information are performed through the PCI bus 6 that is a bus of relatively low speed of the order of 33 MHz, the CPU processing occupation time is extended in accordance with the increase in number of devices that are objects for the status information acquisition.

On the other hand, in the above-mentioned communication function maintenance/diagnosis method (2), since the CPU 40 performs the questioned point identification processing S5 by polling, the detection of the abnormality of the device and the identification of the questioned point can be simultaneously performed. Therefore, only the status information acquisition processing S6 is required to be performed in order to acquire the required status information.

However, since the status information acquisition processing S6 is also performed through the PCI bus, the CPU processing occupation time is extended in accordance with the increase in number of devices that are objects for the status information acquisition.

Also, there are problems that periodically performed polling requires the CPU processing, and that the CPU 40 cannot detect the abnormality until the next polling is performed, depending on the timing of the abnormality notification S1.

SUMMARY OF THE INVENTION

It is accordingly an object of the present invention to shorten the CPU processing occupation time required for the communication function maintenance/diagnosis in a communication apparatus performing communication using IP packets, thereby performing the communication function maintenance/diagnosis processing at a high speed.

In order to achieve the above-mentioned object, the communication apparatus according to the present invention comprises: a diagnostic frame terminator terminating a series of latest status information of diagnosed devices recorded in a diagnostic frame every time the diagnostic frame sequentially passes through a series of diagnosed devices connected in cascade; a content addressable memory preliminarily storing therein as a single entry a series of normal status information in which each status information of the series of diagnosed devices in a normal state is arranged in an order of connection of the diagnosed devices, and generating an abnormality notification when the terminated series of latest status information does not hit the entry; a status information storage storing the terminated series of latest status information; and a CPU acquiring, upon receipt of the abnormality notification, the terminated series of the latest status information from the status information storage to be outputted.

The principle of the present invention will be described referring to FIG. 1. It is to be noted that a partition of hardware 100, software 200, and an operation manager or upper-level CPU 300 shown in FIG. 1 indicates roughly partitioned functions but not an exact partition thereof.

In FIG. 1, the functions of the hardware 100 are possessed by a diagnostic frame terminator 110 as well as a content addressable memory 120 and a status information storage 130 respectively connected thereto. Also in FIG. 1, functions located on the border of the functions of the hardware 100 and the software 200 are possessed by a CPU 140 which is commonly connected to the content addressable memory 120 and the status information storage 130 as shown.

The content addressable memory 120 preliminarily stores therein as a single entry a series of normal status information in which each status information of the series of diagnosed devices connected in cascade in a normal state is arranged in an order of connection of the diagnosed devices.

Also, a diagnostic frame Fn in the state shown in FIG. 1 has already recorded therein a series of latest status information of the diagnosed devices every time all of the diagnosed devices are passed through sequentially.

The diagnostic frame terminator 110 terminates the series of latest status information recorded in the diagnostic frame Fn to be provided to the content addressable memory 120 and the status information storage 130. The content addressable memory 120 generates an abnormality notification S10 if the terminated series of latest status information does not hit (coincide with) the entry. Simultaneously, the status information storage 130 stores the terminated series of latest status information.

Also, upon receiving the abnormality notification S10 from the content addressable memory 120, the CPU 140 acquires the series of latest status information from the status information storage 130 (status information acquisition processing S20 of FIG. 1).

Thereafter, the CPU 140 outputs the acquired series of latest status information, thereby providing a notification S30 similar to that of the conventional technology to the operation manager or upper-level CPU 300.

Thus, the questioned point identification processing S3 itself is not required compared with the case shown in FIG. 7 where the questioned point identification processing S3 and the status information acquisition processing S4 by directly accessing each of the diagnosed devices that have become abnormal are performed after the detection of the abnormality. Also, even in the presence of a plurality of the diagnosed devices that have become abnormal, latest status information of all of the diagnosed devices can be acquired at once by a single status information acquisition processing S20, so that a CPU processing occupation time can be reduced.

Also, compared with the case shown in FIG. 9 where the abnormality is detected by performing the questioned point identification processing S5 by polling, periodical polling is not required. Even in the presence of a plurality of the diagnosed devices that have become abnormal, latest status information of all of the diagnosed devices can be acquired at once by a single status information acquisition processing S20, so that a CPU processing occupation time can be reduced.

Each of the above-mentioned diagnosed devices may have means recording each latest status information thereof upon receipt of the diagnostic frame.

In the above-mentioned communication apparatus, the content addressable memory and the CPU may be mutually connected with a control line, and the CPU and the status information storage may be mutually connected with a PCI bus.

Thus, the abnormality notification S10 from the content addressable memory 120 to the CPU 140 is performed through the control line, and the status information acquisition processing S20 from the CPU 140 to the status information storage 130 is performed through a PCI bus.

In the above-mentioned communication apparatus, one of the diagnosed devices located at one end of the series thereof connected in cascade may be directly connected to the content addressable memory, and with a destination address of the diagnostic frame being made an address of the diagnosed device directly connected to the content addressable memory, the diagnostic frame may be inputted from another one of the diagnosed devices located at the other end.

Namely, one of the diagnosed devices located at an end of the series thereof connected in cascade is directly connected to the content addressable memory, while a diagnostic frame is inputted from another one of the diagnosed devices located at the other end. At this time, by making the destination address of the diagnostic frame the address of the diagnosed device directly connected to the content addressable memory, the diagnostic frame sequentially passes through all of the series of diagnosed devices connected in cascade.

Also, the above-mentioned communication apparatus may further comprise a diagnostic frame generator connected to one end of the series of diagnosed devices connected in cascade, and generating the diagnostic frame to be transmitted.

Namely, the diagnostic frame is generated by a diagnostic frame generator connected to one end of the series of diagnosed devices connected in cascade and transmitted to the communication apparatus.

Thus, for example, a single diagnostic frame generator connected to a plurality of communication apparatuses through communication lines can perform centralized management of maintenance/diagnosis processing of all communication apparatuses connected thereto by generating diagnostic frames for the communication apparatuses to be transmitted.

Also, the above-mentioned communication apparatus may further comprise means transmitting information on whether or not the content addressable memory has performed the abnormality notification in response to the diagnostic frame as a diagnosis result frame to the diagnostic frame generator.

Namely, a diagnosis result frame transmitted to the diagnostic frame generator includes information on whether or not the content addressable memory has performed an abnormality notification in response to the received diagnostic frame.

Therefore, the diagnostic frame generator can be informed of presence or absence of an abnormality in the communication apparatus that is the destination of the diagnostic frame.

Also, the above-mentioned diagnostic frame generator may generate, periodically or at a desired designated time, the diagnostic frame to be transmitted.

According to the communication apparatus of the present invention, the CPU is not required to perform the questioned point identification processing and the periodical polling, different from the prior art. Even in the presence of a plurality of diagnosed devices that have become abnormal, latest status information of all of the diagnosed devices can be acquired at once by a single status information acquisition processing, so that a CPU processing occupation time required for the communication function maintenance/diagnosis can be reduced. Therefore, the communication function maintenance/diagnosis can be performed at a high speed.

Also, a control line for an abnormality notification was required conventionally to be provided for each of the diagnosed devices, while according to the communication apparatus of the present invention, a control line for abnormality notification has only to be provided between the CPU and the content addressable memory. Therefore, an effect is achieved such that wiring area for the control line on the printed board composing the communication apparatus can be reduced.

BRIEF DESCRIPTION OF THE DRAWINGS

The above and other objects and advantages of the invention will be apparent upon consideration of the following detailed description, taken in conjunction with the involving drawings, in which the reference numerals refer to like parts throughout and in which:

FIGS. 4A and 4B are diagrams illustrating a frame format of a diagnostic frame in the present invention;

DESCRIPTION OF THE EMBODIMENTS

Figure 1:
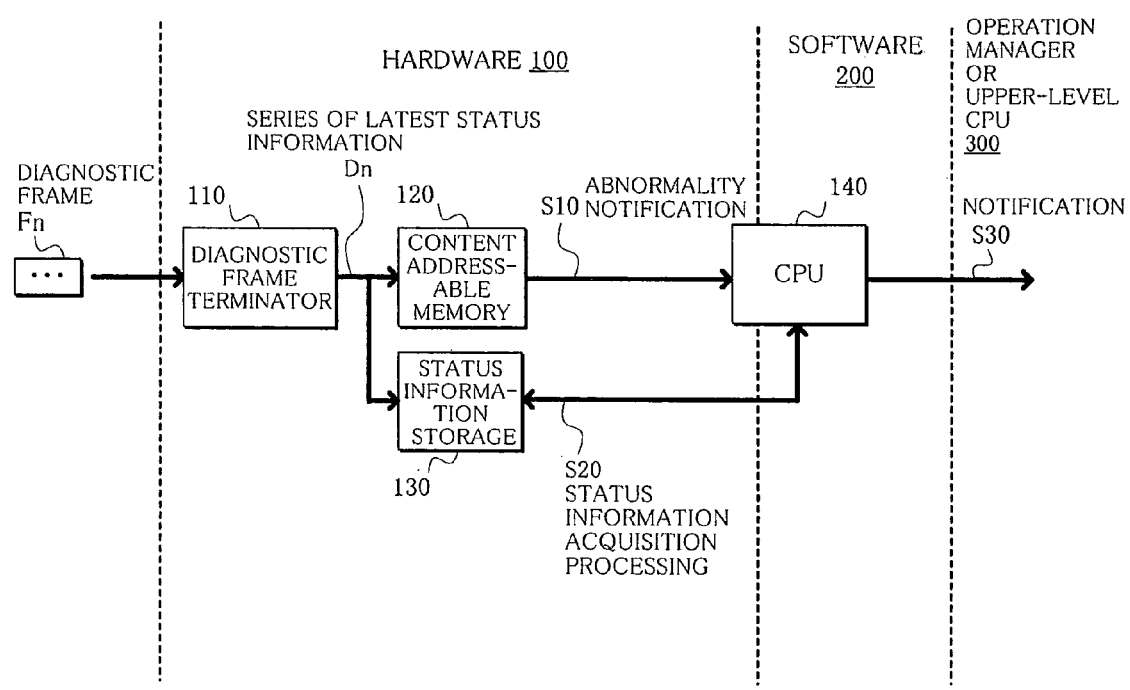
FIG. 1 is a block diagram showing a principle arrangement of a communication apparatus according to the present invention.
Figure 2:
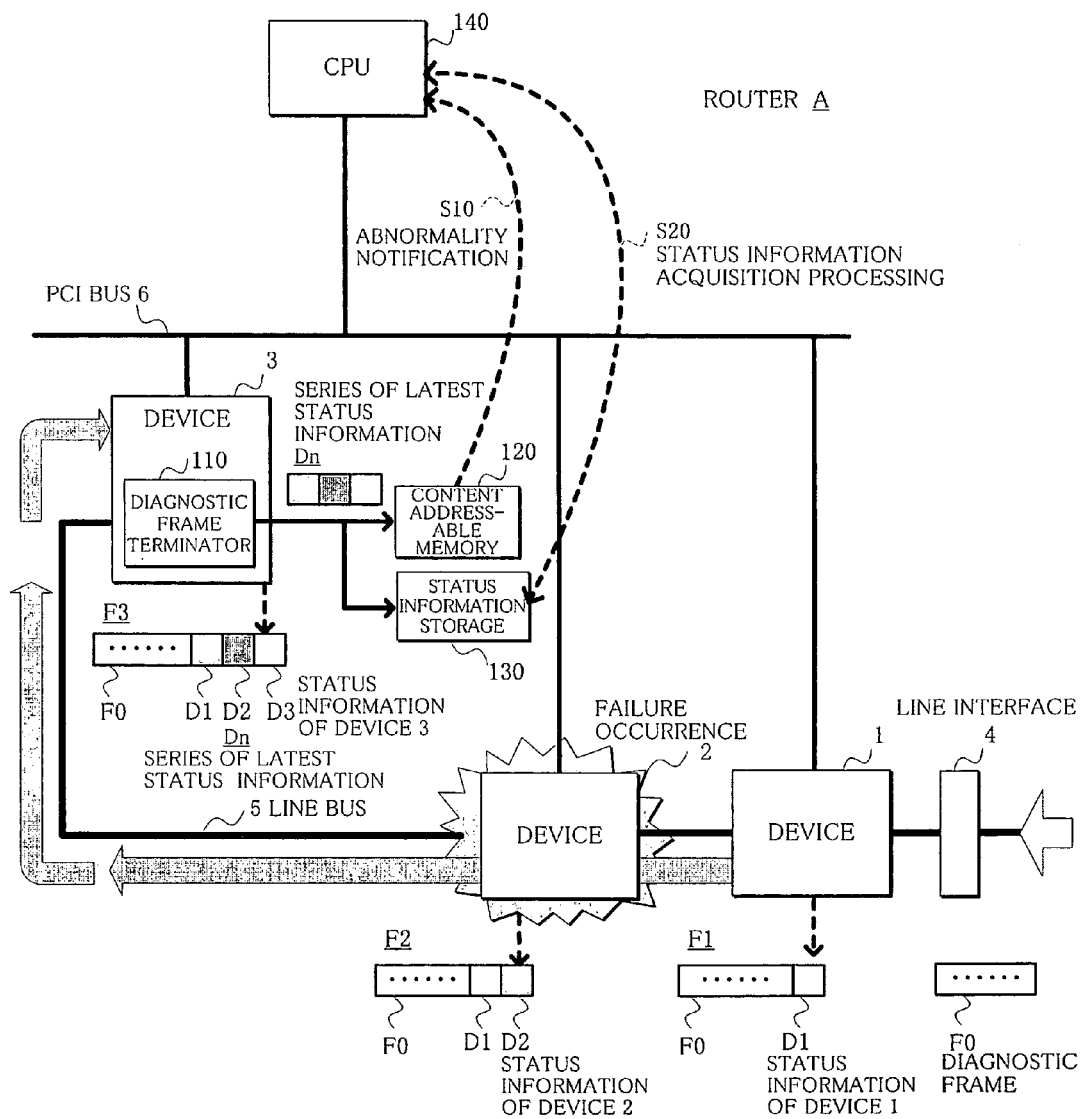
FIG. 2 is a block diagram showing an embodiment (1) of a communication apparatus according to the present invention.

FIG. 2 shows an arrangement of a router A as an embodiment (1) of a communication apparatus of the present invention. As shown in FIG. 2, the router A is composed of devices 1-3 sequentially connected from a line interface 4 with a line bus 5, and a CPU 140 commonly connected to the devices 1-3 with a PCI bus 6.

The device 3 has a diagnostic frame terminator 110 to which a content addressable memory 120 and a status information storage 130 outside of the device 3 are connected as shown in FIG. 2. Among these, the content addressable memory 120 is used for normal IP packet processing in a conventional manner. However, in the router A, the content addressable memory 120 preliminarily stores a series of normal status information consisting of each status information at a normal state of all of the devices 1-3.

The series of status information is typically an entry, for example, with "0" for all of the bits, but the status information at a normal state does not always have "0" for all of the bits depending on the device.

It is to be noted, although not shown in FIG. 2, that the content addressable memory 120 and the CPU 140 are mutually connected with a control line, and that the status information storage 130 and the CPU 140 are mutually connected with a PCI bus. However, the status information storage 130 may be included in the device 3, in which the device 3 and the CPU 140 are mutually connected with a PCI bus 6, so that the status information storage 130 and the CPU 140 are mutually connected with a PCI bus.

In operation, every time the diagnostic frame F0 received by the router A through the line interface 4 passes through the devices 1-3, the respective status information D1-D3 is added thereto as shown by diagnostic frames F1-F3. It is to be noted that all of the diagnostic frames F1-F3 show the states of the diagnostic frame F0. Namely, the diagnostic frame F1 shows the state where the status information D1 of the device 1 is added to the diagnostic frame F0. The diagnostic frame F2 shows the state where the status information D2 of the device 2 is further added to the diagnostic frame F0. The diagnostic frame F3 shows the state where the status information D3 of the device 3 is further added to the diagnostic frame F0.

In the device 3, the diagnostic frame F3 after having the status information D3 further added to the diagnostic frame F0 has a series of latest status information Dn composed of the status information D1-D3 recorded therein. Therefore, the diagnostic frame terminator 110 terminates the series of latest status information Dn recorded in the diagnostic frame F3 to be provided to the content addressable memory 120 and the status information storage 130. Thus, the series of latest status information Dn is stored in the status information storage 130 and searched in the content addressable memory 120 to find whether or not a hit entry exists therein.

In the absence of an abnormality in the devices 1-3, the series of latest status information Dn are to hit the above-mentioned series of the normal status information.

Therefore, in the absence of a hit entry in the content addressable memory 120, it is implied that a failure has occurred in at least one of the devices 1-3, so that the content addressable memory 120 generates an abnormality notification S10 to the CPU140. The CPU 140 having received the abnormality notification S10 performs status information acquisition processing S20 for the status information storage 130.

It is to be noted that in the router A, the device 3 is directly connected to the content addressable memory 120 as shown in FIG. 2, and that this device 3 finally adds the status information D3 to the diagnostic frame F0. Therefore, it is supposed that the address of the device 3 is preset in the destination address of the diagnostic frame F0. In this case, a MAC address can be used for the address.

It is now supposed that a failure has occurred in the device 2. In this case, the status information D2 of the device 2 assumes a value indicating an abnormality. Since an entry hit by the series of latest status information does not exist in the content addressable memory 120, the entry and the series of latest status information result in a mishit. Therefore, the content addressable memory 120 generates the abnormality notification S10. The CPU 140 having received this notification acquires the latest status information D1-D3 of the devices 1-3 at once from the status information storage 130 by the status information acquisition processing S20. The latest status information D2 of the device 2 is included in the latest status information D1-D3, so that the CPU 140 is not required to access the device 2 through the PCI bus 6, as has been conventionally required.

It is to be noted that in case of acquiring the status information D2 by accessing the device 2 through the PCI bus 6 in a conventional manner, the CPU processing occupation time assumes approximately 690 nsec if the status information is 4 bytes (32 bits). Therefore, when a plurality of devices become abnormal at the same time, for example, the status information acquisition processing is required for each of the devices. Thus, a simple calculation shows that the CPU processing occupation time of a value equal to 690 nsec multiplied by the number of devices that are abnormal is required (if all of the devices 1-3 are abnormal in the example of FIG. 2, 690 nsec×3=2,070 nsec).

On the other hand in the router A of FIG. 2, when a simulation is performed in a state where the device 1 is omitted under the condition that the device 3 and the content addressable memory 120 are mutually connected with a data bus of 156.25 MHz (72 bits), and the devices 2 and 3 are mutually connected with a line bus 5 of 312.5 MHz (16 bits), the series of latest status information can be obtained every 51 nsec if the 64-byte diagnostic frames (including status information of 4-16 bytes) are continuously transmitted. Namely, the status information storage 130 is renewed every 51 nsec.

In case of the router A, since the status information acquisition processing S20 by the CPU 140 is performed through the PCI bus 6, the first status information acquisition processing S20 itself requires the same length of time as in the above-mentioned case of accessing the device 2. However, since it is possible to acquire the latest status information of a plurality of devices all at once, as the number of the devices requiring the acquisition of the status information increases, the CPU processing occupation time can be shortened compared with the conventional technology.

Figure 7:
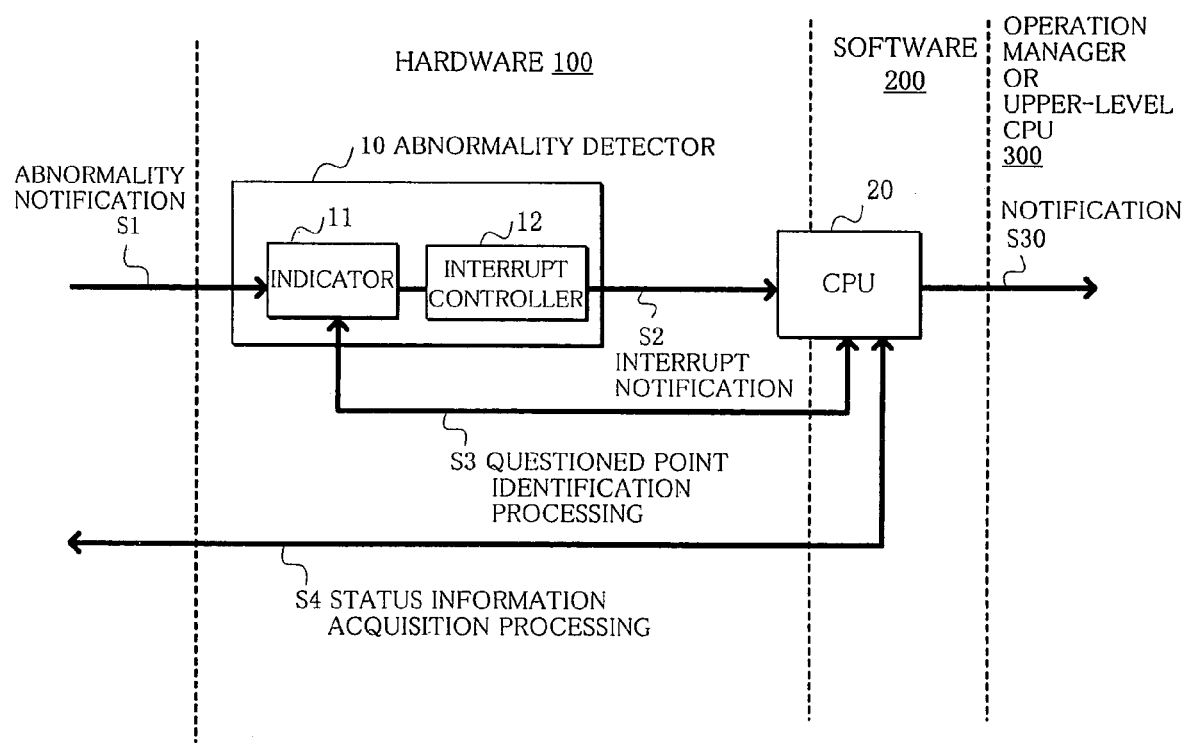
FIG. 7 is a block diagram showing a conventional communication function maintenance/diagnosis method (1)
Figure 8:
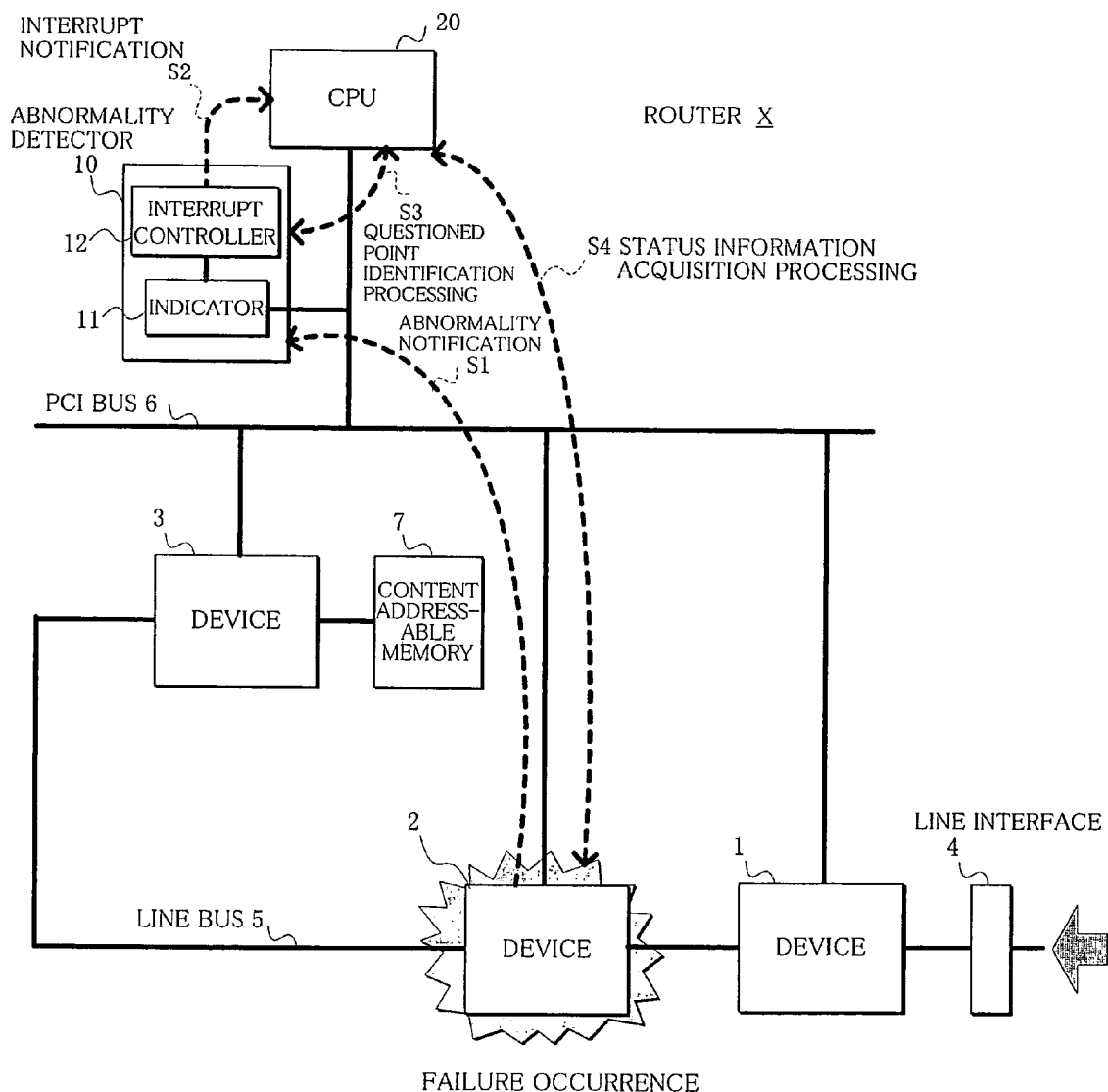
FIG. 8 is a block diagram showing an internal arrangement of a router using the conventional communication function maintenance/diagnosis method (1)
Figure 9:
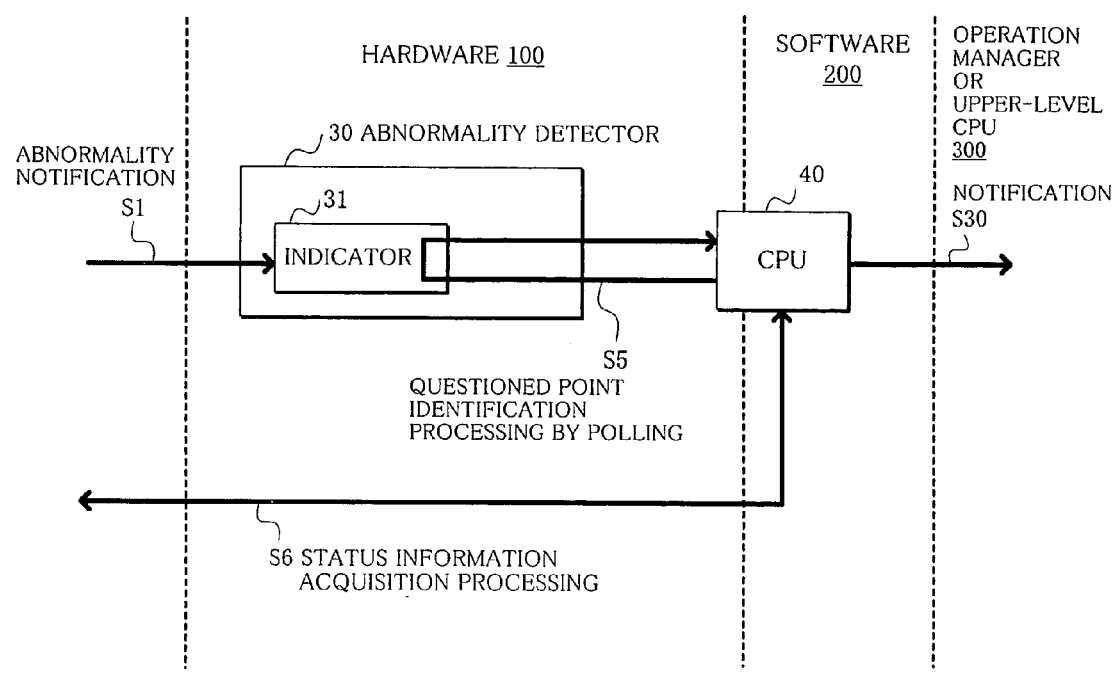
FIG. 9 is a block diagram showing a conventional communication function maintenance/diagnosis method (2).

Also, in case of the conventional communication function maintenance/diagnosis methods (1) and (2) respectively shown in FIGS. 7 and 9, the abnormality notification S1 for the abnormality detectors 10 and 30 are generated by the devices. Therefore, it is required that the devices and the abnormality detectors 10 and 30 are mutually connected with control lines. However, in case of the embodiment (1) shown in FIG. 2, only the content addressable memory 120 and the CPU 140 are required to be mutually connected with a control line for the abnormality notification S10.

Such a small number of the control lines has a merit that the wiring area for the control lines on the printed board composing the communication apparatus is reduced, which is particularly effective in case of an apparatus composed of a plurality of printed boards piled.

A diagnostic frame processing flow after the diagnostic frame F0 has arrived at the device 3 in FIG. 2 will now be described referring to FIG. 3. It is to be noted that in FIG. 3, processing steps without any specific description are performed by the device 3.

Upon receiving the frame (at step S100), the device 3 firstly determines whether or not the destination MAC address of the received frame is the MAC address of its own device (at step S101).

If the MAC address of the received frame is not the MAC address of its own device at step S101, the device 3 discards the frame (at step S110). If it is the MAC address of its own device, the device 3 further checks whether the frame is an IPv4 frame or an IPv6 frame (at step S102).

Moreover, if the frame is the IPv4 frame or the IPv6 frame at step S102, the device 3 performs normal frame processing (at step S111) and then relays the frame (at step S112). The received frame is a diagnostic frame if it is not the IPv4 frame or the IPv6 frame, so that the device 3 acquires the status information of its own device (at step S103).

The diagnostic frame terminator 110 within the device 3 terminates the series of latest status information recorded in the diagnostic frame to be stored in the status information storage 130 and to be inputted to the content addressable memory 120 (at step S104).

The content addressable memory 120 searches the entry by using the series of latest status information inputted at step S104 from the diagnostic frame terminator 110 (at step S105).

Moreover, the content addressable memory 120 determines whether or not the search result of the step S105 is a mishit where the series of latest status information and the entry of the series of normal status information preliminarily stored in the content addressable memory 120 do not coincide with each other, at step S106. If it is not a mishit, it is implied that the status information of all of the devices coincides with the status information of the normal state, so that it is diagnosed that there is no abnormality.

In case of a mishit at the step S106, it is implied that the status information of at least one of the devices assumes an abnormal value, so that the content addressable memory 120 provides the abnormality notification S10 to the CPU 140 (at step S107).

The CPU 140 having received the abnormality notification S10 from the content addressable memory 120 at step S107 acquires the series of latest status information from the status information storage 130 (at step S108). It is to be noted that the processing of the step S108 corresponds to the status information acquisition processing S20 of FIG. 2.

Figure 3:
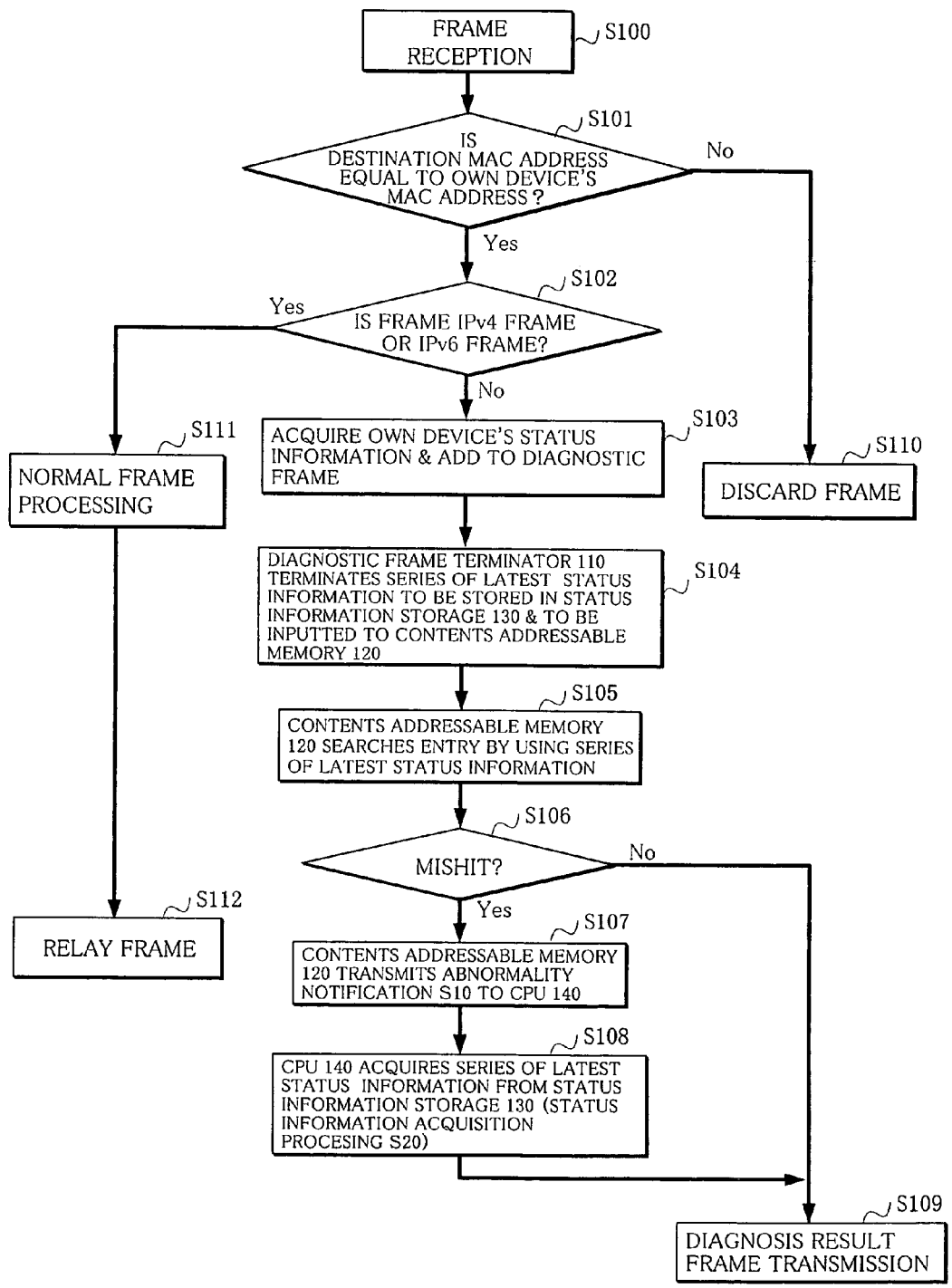
FIG. 3 is a flowchart showing a diagnostic frame processing flow in the embodiment (1)

In FIG. 3, a diagnosis result frame transmission by the device 3 is shown at step S109. Although not shown in FIG. 2, this processing can be added as a processing performed by the device 3. Namely, the device 3 transmits a diagnosis result frame of "diagnosis result: OK" indicating "absence of abnormality" in case of the mishit at step S106, and transmits a diagnosis result frame of "diagnosis result: NG" indicating "presence of abnormality" since an abnormality is detected if step S109 is executed after step S108. It is to be noted that the destination of the diagnosis result frame is a diagnostic frame generator which will be described later.

A frame format of the diagnostic frame will now be described referring to FIGS. 4A and 4B, which respectively show frame formats of the normal IPv4 frame Fv4 and the diagnostic frame F0.

As shown in FIG. 4A, the IPv4 frame Fv4 is composed of a source MAC address, a destination MAC address, a tag, a type, an IP header, a source IP address, a destination IP address, and data.

As shown in FIG. 4B, although the diagnostic frame F0 has a similar arrangement to the IPv4 frame Fv4 shown in FIG. 4A, the value of the version in the IP header is different. The values of version are "4" and "0", which indicate the IP versions, respectively shown in FIGS. 4A and 4B at positions pointed by arrows. For example, it is indicated that the frame is the IPv4 frame if the value is "4", and the frame is the IPv6 frame if it is "6". For the diagnostic frame F0, this value is set to "0" so that it does not correspond to any of the IP versions.

Therefore, at step S103 of the above-mentioned diagnostic frame processing flow shown in FIG. 3, it can be found whether or not the received frame is the IPv4 frame or the IPv6 frame by checking the value of version.

Also, the diagnostic frame F0 has the status information of the devices 1-3 stored in the data area. In the example of FIG. 4B, areas for the status information of device 1-3 respectively composed of 32 bits are secured, and padding is performed to the remaining area.

Next, as an embodiment (2) of the communication apparatus according to the present invention, a case will now be described, where the router A in the above-mentioned embodiment (1) and a router B having the same arrangement as that of the router A are mutually connected with a communication line, and a diagnostic frame generator Cf is further connected to the router A with the communication line.

Figure 5:
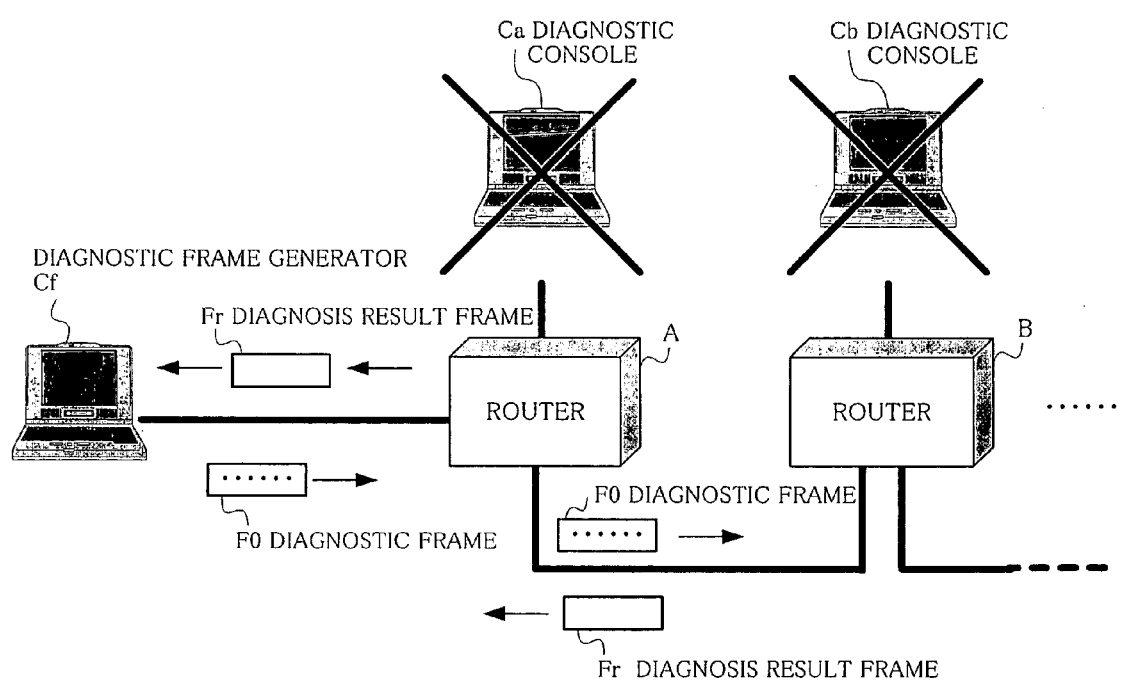
FIG. 5 is a block diagram showing an embodiment (2) of a communication apparatus according to the present invention.

In this case, as shown in FIG. 5, respective diagnostic consoles Ca and Cb that have been conventionally required by the routers A and B become unnecessary.

The diagnostic frame generator Cf substitutes the diagnostic consoles Ca and Cb, and singly performs diagnoses for both of the routers A and B.

In operation, the diagnostic frame generator Cf generates diagnostic frames F0 addressed to the routers A and B periodically or at a desirable designated time to be transmitted through the communication line. However, in this case, it is supposed that the diagnostic frame generator Cf knows the devices that are directly connected to the content addressable memories in the routers A and B, and the addresses of these devices are set as the destination addresses of the diagnostic frames F0.

In the routers A and B having received the diagnostic frames F0, the devices respectively designated by the destination addresses perform the diagnostic frame processing similar to that in the above-mentioned embodiment (1) shown in FIG. 3, and transmit the diagnosis result frames Fr at step S109 of FIG. 3.

As shown in FIG. 5, the diagnosis result frames Fr transmitted from the routers A and B are returned to the diagnostic frame generator Cf through the communication line. Therefore, the diagnostic frame generator Cf can collectively ascertain the diagnosis results of the routers A and B.

For an application of the embodiment (2), the diagnostic frame generator Cf may transmit the diagnostic frame F0 addressed to the router A periodically or at a desirable designated time. The router A transfers the diagnostic frame F0 to the router B after performing the diagnostic frame processing for the devices within the router A similar to that of the above-mentioned embodiment (1) shown in FIG. 3.

Figure 6:
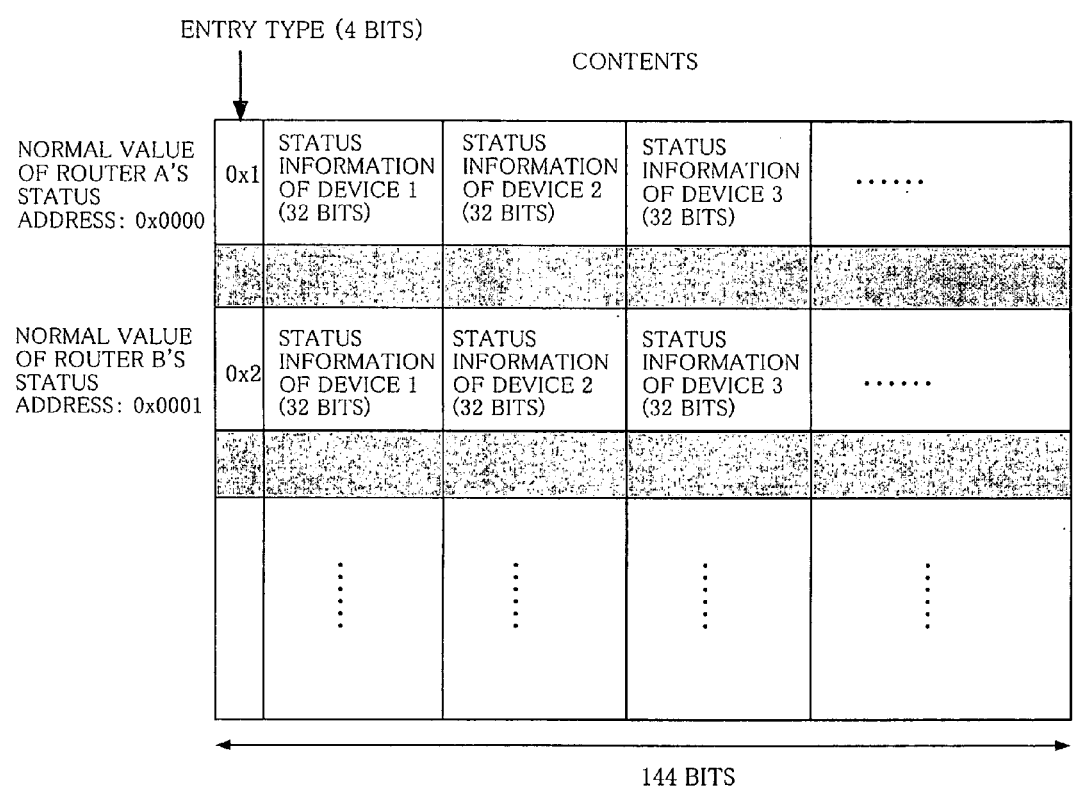
FIG. 6 is a diagram showing an arrangement of a content addressable memory in the embodiment (2)

In this case, the content addressable memory in the router B may have, for example, an arrangement shown in FIG. 6.

Namely, since the diagnostic frame F0 can store the status information of the routers A and B, an entry type "0x1" composed of 4 bits and status information of the devices 1-3 respectively of 32 bits are stored as an entry for the address "0x0000" indicating the normal values (values of the status information at a normal state) of the devices in the router A.

Also, an entry type "0x2" and status information of the devices 1-3 respectively of 32 bits are stored as an entry for the address "0x0001" indicating the normal values of the devices in router B. It is to be noted that the above-mentioned entry type is a code for identifying the routers in case of the presence of a plurality of routes.

In the example shown in FIG. 6, the status information of 144 bits at maximum per single router can be stored as contents of the content addressable memory. Namely, the search for the status information of maximum 144 bits is possible.

For example, when the router B of FIG. 5 has such a content addressable memory, both of the diagnosis results for the routers A and B can be obtained by the router B.

It is to be noted that when the routers A and B independently performs the diagnosis for their own devices respectively, the entries of the address "0x000" and "0x001" respectively have only to be stored in the respective content addressable memories.

The device 1 is, for example, an LSI having a function of processing what is located in the first layer (PHY layer) of the OSI reference model. The OSI reference model defines physical connection/transmission method of the network for the PHY layer, which is occasionally abbreviated as "PHY" taking a head part of the English notation. Specifically, cable materials, connector shapes, and mutual transformation methods between data and electric signals (regulations of voltage, etc.) belong to this layer. In the physical layer, contents of the data are not at all concerned.

The device 2 is, for example, an LSI having a function of processing what is located in the lower (MAC layer) of the sub-layers of the data link layer in the OSI 7-layer model. The OSI reference model defines transmission and reception methods of a frame (unit of data transmission/reception), frame formats, error detecting methods, and the like for the MAC layer.

The device 3 has, for example, a load balancing function of LSC (Load Sharing Controller) IP frames, and is designed with an FPGA (Filed Programmable Logic). The LSC determines a destination of distribution based on header information of an arrived packet, rewrites source/destination MAC addresses, and transmits the packet to the destination of distribution. The header information of the IP frame to be distributed is stored in the CAM (content addressable memory), so that the LSC rewrites the MAC address of the frame for which the result of the CAM search is a hit and transmits the packet.

What is claimed is:

1. A communication apparatus comprising:
    a diagnostic frame terminator terminating a series of latest status information of diagnosed devices recorded in a diagnostic frame every time the diagnostic frame sequentially passes through a series of diagnosed devices connected in cascade;
    a content addressable memory preliminarily storing therein as a single entry a series of normal status information in which each status information of the series of diagnosed devices in a normal state is arranged in an order of connection of the diagnosed devices, and generating an abnormality notification when the terminated series of latest status information does not hit the entry;
    a status information storage storing the terminated series of latest status information; and
    a CPU acquiring, upon receipt of the abnormality notification, the terminated series of the latest status information from the status information storage to be outputted.

2. The communication apparatus as claimed in claim 1, wherein each of the diagnosed devices has means recording each latest status information thereof upon receipt of the diagnostic frame.

3. The communication apparatus as claimed in claim 1, wherein the content addressable memory and the CPU are mutually connected with a control line, and the CPU and the status information storage are mutually connected with a PCI bus.

4. The communication apparatus as claimed in claim 1, wherein one of the diagnosed devices located at one end of the series thereof connected in cascade is directly connected to the content addressable memory, and with a destination address of the diagnostic frame being made an address of the diagnosed device directly connected to the content addressable memory, the diagnostic frame is inputted from another one of the diagnosed devices located at the other end.

5. The communication apparatus as claimed in claim 1, further comprising a diagnostic frame generator connected to one end of the series of diagnosed devices connected in cascade, and generating the diagnostic frame to be transmitted.

6. The communication apparatus as claimed in claim 5, further comprising means transmitting information on whether or not the content addressable memory has performed the abnormality notification in response to the diagnostic frame as a diagnosis result frame to the diagnostic frame generator.

7. The communication apparatus as claimed in claim 5, wherein the diagnostic frame generator periodically generates the diagnostic frame to be transmitted.

8. The communication apparatus as claimed in claim 5, wherein the diagnostic frame generator generates the diagnostic frame at a desired designated time to be transmitted.

* * * * *